United States Patent [19]
Berke et al.

[11] Patent Number: 6,119,633
[45] Date of Patent: Sep. 19, 2000

[54] REMOTELY RELEASABLE DOG MUZZLE

[75] Inventors: E. William Berke, Orange; Nicholas Vertucci, Irvine, both of Calif.; Gary B. Erwin, Ocoee, Tenn.

[73] Assignee: Stunmuzzle, LLC., Orange, Calif.

[21] Appl. No.: 09/217,014

[22] Filed: Dec. 21, 1998

[51] Int. Cl.[7] .......................... A01K 25/00; A01K 29/00
[52] U.S. Cl. ...................... 119/822; 119/831; 119/859; 119/908
[58] Field of Search .................... 119/822, 828, 119/831, 832, 859, 720, 772, 908

[56] References Cited

U.S. PATENT DOCUMENTS

| | | | |
|---|---|---|---|
| 2,658,478 | 11/1953 | Jones | 119/822 |
| 2,940,425 | 6/1960 | Dykens . | |
| 3,733,530 | 5/1973 | Labart et al. | 54/1 |
| 4,627,385 | 12/1986 | Vinci . | |
| 4,651,678 | 3/1987 | Kime . | |
| 4,733,633 | 3/1988 | Yarnall, Sr. et al. | 340/573 X |
| 4,745,882 | 5/1988 | Yarnall, Sr. et al. | 340/573 X |
| 4,876,674 | 10/1989 | Parmely et al. . | |
| 4,887,549 | 12/1989 | Powell . | |
| 4,919,082 | 4/1990 | Tsai | 119/720 |
| 5,515,033 | 5/1996 | Matarazzo | 340/573 |
| 5,588,398 | 12/1996 | Allen, II et al. | 119/822 |
| 5,617,814 | 4/1997 | Bianco et al. | 119/720 |
| 5,636,597 | 6/1997 | Van Curen et al. | 119/720 |
| 5,771,668 | 6/1998 | Younger | 54/1 |
| 5,949,339 | 9/1999 | Ettinger et al. | 54/1 |

*Primary Examiner*—Robert P. Swiatek
*Attorney, Agent, or Firm*—Lyon & Lyon LLP

[57] ABSTRACT

A dog muzzle or similar device attachable to a dog, and having attached thereto an accessory pod which can comprise or include a remotely actuable stun gun. The device further includes a quick release unit which allows the muzzle and stun gun to be released from the dog, and the quick release unit also is remotely controllable.

10 Claims, 4 Drawing Sheets

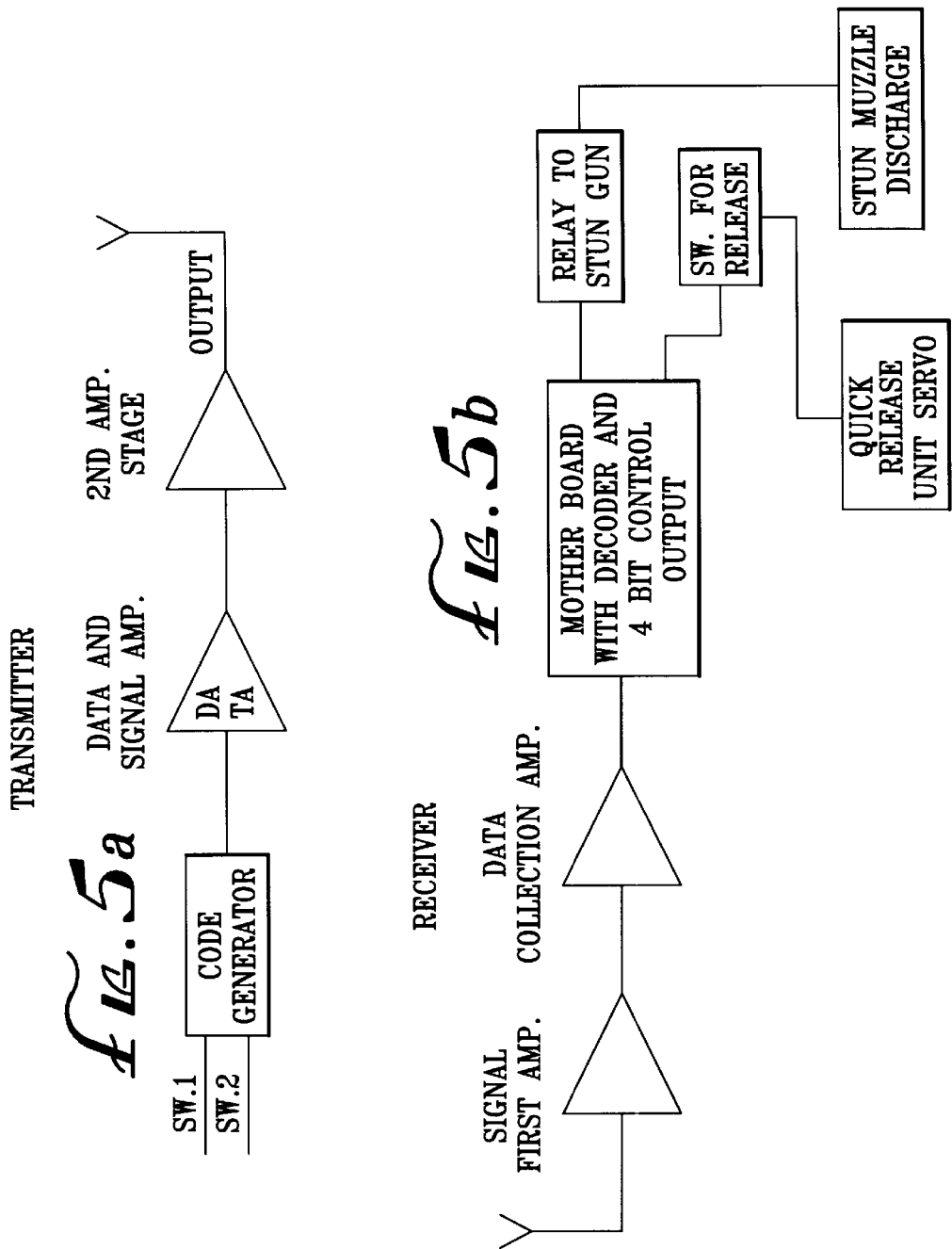

REMOTELY RELEASABLE DOG MUZZLE

BACKGROUND OF THE INVENTION

The subject matter of this application relates to that of U.S. Pat. No. 5,588,398 issued Dec. 31, 1996, and application Ser. No. 08/718,366 filed Aug. 27, 1996, now abandoned, the disclosures of which are incorporated herein by reference.

BACKGROUND OF INVENTION

The present invention relates to apparatus and equipment for use in conjunction with dogs used for law enforcement, guard duties, search and rescue operations, and the like. More particularly, the invention relates to a dog muzzle, harness or other type of device attachable to a dog having functions and accessories remotely controllable by law enforcement and other authorized personnel, such as an associated stun gun and a remotely releasable muzzle or harness.

BACKGROUND ART

Larger, aggressive dogs such as German Shepherds, and the like are widely used by police, military and security personnel throughout the world. Such dogs, commonly referred to as police dogs, are used to perform search and rescue activities, and to locate persons suspected of crimes, using their keen sense of smell, hearing and sight. When appropriately trained, police dogs also are effective in subduing suspects, especially those that have attempted to secrete themselves in locations that are difficult to access by police personnel. Thus, police dogs may be used to rout suspects hiding under vehicles, within confined spaces such as tunnels or crawl spaces within the buildings, and similar locations. However, there are problems associated with the use of police dogs to apprehend criminal suspects.

Civil and criminal suits have been brought against law enforcement agencies that have employed police dogs which have bitten suspects during their apprehension. Thus, economic considerations alone would be a sufficient motivation to solve the dog bite problem. Moreover, it would be desirable for humanitarian as well as public relations considerations to be able to utilize the unique capabilities of police dogs to apprehend or subdue suspects, without usually causing physical harm to the suspect. Because of the foregoing concerns, some law enforcement agencies have resorted to equipping their dogs used in police work with muzzles. However, a disadvantage of that approach is that criminal suspects are less likely to submit to apprehension by a dog that is muzzled and therefore unable to bite the suspect. Accordingly, a problem exists with prior art methods of effectively utilizing police dogs for criminal apprehension and crowd control, while still preventing the dogs from inflicting physical injuries on suspects or members of a crowd.

U.S. Pat. No. 5,588,398 and the application referred to above describe, inter alia, a novel dog muzzle including an attached accessory pod provided with various devices for emitting stimuli or sensing physical parameters within the vicinity of a dog fitted with the muzzle or other device attachable to the dog. In particular, the dog muzzle disclosed therein is of a typical perforated cup-shaped shield or snout cover adapted to fit over the face of the dog. The muzzle is secured to the dog by suitable straps. A "stun gun" is attached to the shield and contains the usual high voltage power supply having an on/off control connected to an electronic switch remotely controlled via a radio receiver. A radio transmitter operated by a person located remotely from the dog fitted with the muzzle is used to transmit coded signals on a modulated radio frequency carrier to the receiver disposed on the muzzle or on the dog, thereby actuating the electronic switch and causing high voltage electrical sparks to arc between the stun gun electrodes. Depending upon the proximity of the dog to a suspect, the suspect may be encouraged to remain stationary to permit being taken into custody because of the threat of being shocked or, alternatively, being contacted by the arcs to temporarily immobolize the suspect's voluntary muscles if the suspect continues to resist apprehension. Other devices are described therein for use in the accessory pod.

The devices of the foregoing patent and application are particularly useful for the purposes enumerated. However, there are situations in which it is particularly desirable to allow the dog to go into an attack mode whereby the dog can threaten and actually bite the suspect. Accordingly, the present invention, in addition to providing a remotely controllable stun gun or other device, further includes a remotely controllable release for the muzzle, collar harness or other device attached to the dog, so that the muzzle and stun gun can readily fall off of the dog and not impede the dog's action towards the suspect.

Accordingly, it is a principal object of the present invention to provide a dog muzzle or similar device attachable to a dog and with a remotely controllable device for allowing remote release thereof from the dog.

Another object of the present invention is to provide an improved accessory for use with dogs.

A further object of the present invention is to provide a dog muzzle, collar harness or similar device attachable to a dog and with a remotely controllable stun gun or other devices, further with a remotely controllable device for enabling the muzzle, harness, or the like, to be released to allow the same to fall off of the dog.

BRIEF DESCRIPTION OF DRAWINGS

These and other objects and features of the present invention will become better understood through a consideration of the following description taken in conjunction with the drawings in which

FIGS. 5a and 5b are respective block diagrams of a transmitter and receiver for controlling the stun gun or other stimuli or sensing device; and for controlling release of the muzzle, harness or other device attached to the dog.

DETAILED DESCRIPTION

Figure 1:
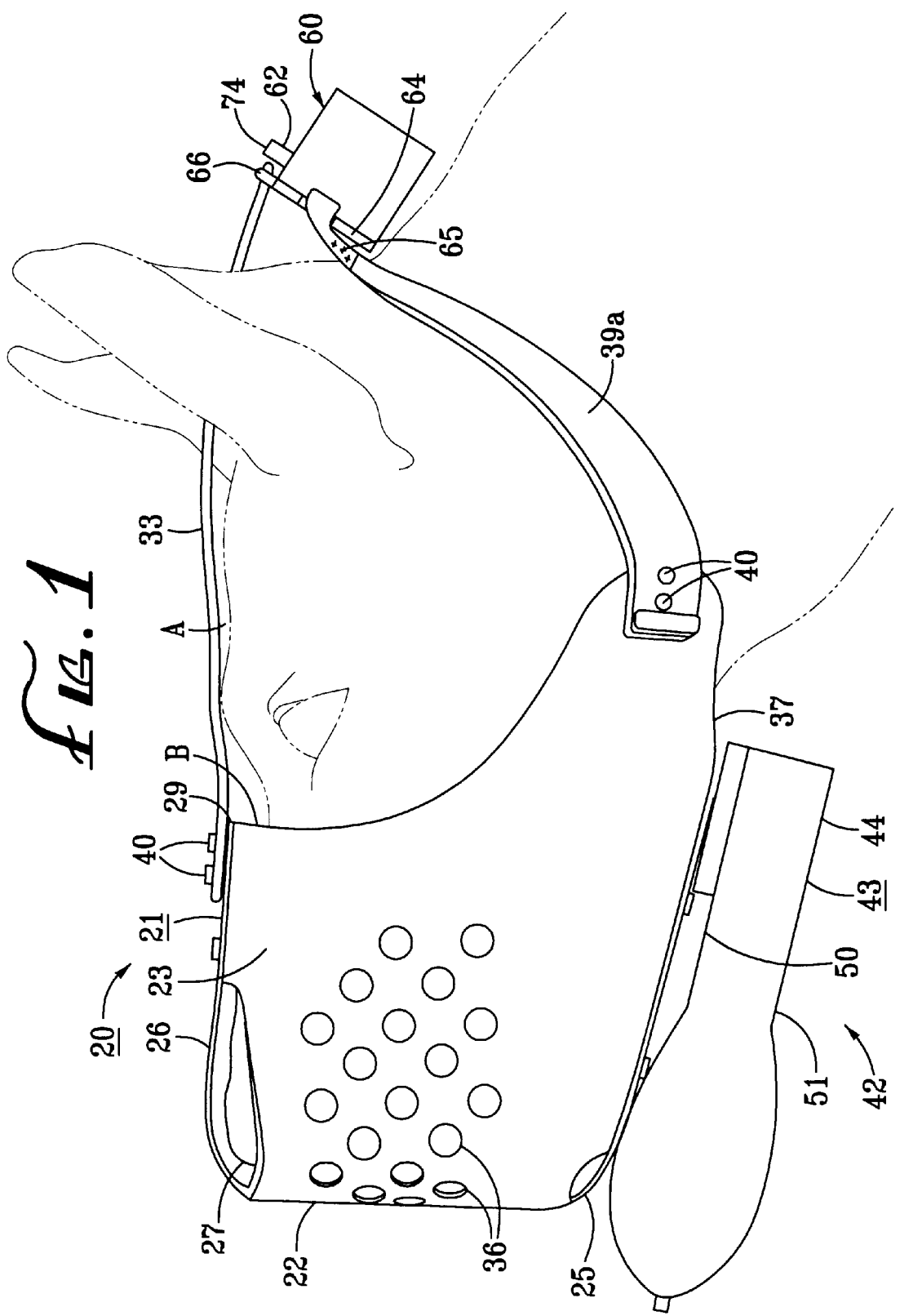
FIG. 1 is a left side elevation view of a dog muzzle according to the present invention, showing the muzzle attached to the dog, and with a remote release device included therewith.
Figure 2:
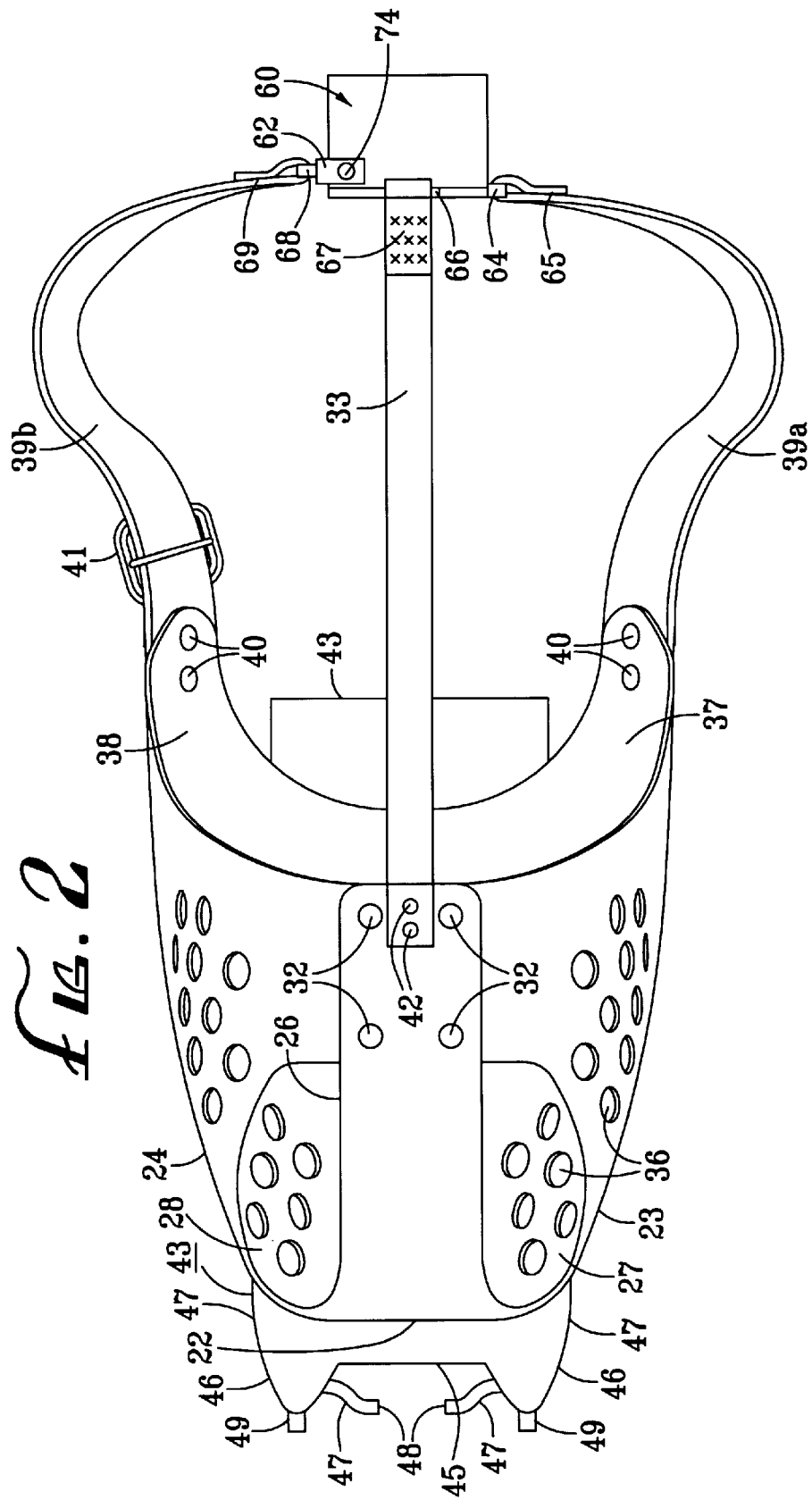
FIG. 2 is an upper plan view of the muzzle of FIG. 1.

Turning now to the drawings, and first to FIGS. 1 and 2, a remotely controllable dog muzzle according to the present invention is shown. A muzzle 20 of essentially the standard type (except for modification further described herein) includes a cup-shaped snout shield 21 that is adapted to fit over the snout or muzzle B of a dog A. Shield 21 preferably is made of a thin sheet of flexible, electrically non-conducting materials such as leather or flexible plastic. As seen in FIGS. 1 and 2, the shield 21 has a generally rectangularly-shaped front wall 22, and symmetrical trapezoidally-shaped left and right side walls 23 and 24 that protrude rearward from the front wall. The side walls 23 and 24 are continuous with and curve initially outward from the front wall 22, and then inward from a vertical longitudinal center plane of the shield. The shield 21 also has a generally trapezoidal-shaped bottom wall 25 that protrudes rearward from the front wall and diverges downward from a horizontal center plane of the shield.

The shield 21 further includes a generally rectangularly-shaped upper wall 26 that protrudes rearward from the front wall 22. The width of the upper wall 26 preferably is less than the spacing between the front portion of left and right side walls 23 and 24, thus forming with the side walls longitudinally elongated triangular-shaped left and right vent openings 27 and 28. The upper wall 26 has a transversely disposed rear edge wall 29. Upper ends of the side walls 23 and 24 are attached to the upper wall 26 by a suitable fastener, such as rivets 32. Preferably these side walls 23 and 24 and front wall 22 of the shield 21 are provided with a plurality of ventilating perforations 36.

As best seen in FIG. 2, the left and right side walls 23 and 24 have rearwardly projecting left and right collar strap tabs 37 and 38, respectively. A collar strap for attachment around the head of a dog as particularly seen in FIG. 1 is provided and includes right and left sections 39a and 39b respectively attached to the tabs 37 and 38 in any suitable manner as by rivets 40. An adjustable buckle such as 41 may be provided on one or the other of straps 39a and 39b. A further rearwardly projecting strap 33 is provided and has its forward end attached to the upper wall 26 by any suitable fastener such as rivets 34.

Referring to FIGS. 1 and 2, an accessory pod 42 comprises a remotely operable, electrical arcing device or "stun gun" 43. The stun gun 43 includes an elongated, generally rectangular housing 44 with a transversely disposed front wall 45 that is oriented parallel to the front wall 22 of the shield 21, and may protrude forward beyond the lower edge or the front wall of the shield 21. The stun gun 43 also includes a pair of laterally opposed bosses 46 that are continuous with the side walls 44 and protrude forward beyond the front wall 45. The stun gun includes a pair of electrodes 47 that protrude inwardly toward one another from the bosses 46. The stun gun further includes a pair of laterally spaced electrodes 49 which are electrically connected with adjacent electrodes 47. When the electrodes 49 are disposed sufficiently close to even a relatively poorly conducting surface such as human skin, electrical arcs will jump from the electrodes to that surface.

The dog muzzle device thus far described, except for the strap 33, is like that shown and described in the aforesaid patent and patent application. The improvement of the present application relates to a remotely actuable quick release unit 60 which can be remotely actuated to cause the straps 39a and 39b to release, thereby enabling the muzzle and stun gun to fall from or off the dog. Basically, in a preferred embodiment, the unit 60 includes a servo device (to be described below) which allows a "U" shaped hook 62 affixed to the strap 39b to be released from the unit 60, and when this occurs, movement of the dog and weight of the muzzle and stun gun allow the same to fall off the dog. The left strap 39a is affixed to a first loop section 64 in a cover plate 78 of the body 79 of unit 60 by the end of the strap 39a being threaded through the hook section 64 and secured as by stitching 65. The strap 33 is similarly attached to a second hook section 66 and secured by stitching 67. The strap 33 fits between the ears of the dog. Similarly, the end of the right hand strap 39b is threaded through a loop 68 on the hook 62 and secured by stitching 69. The hook 62 is a U-shaped hook as best seen in FIG. 3b and normally is secured to the unit 60 by retractable pins 74 and 75.

Figures 3A, 3B:
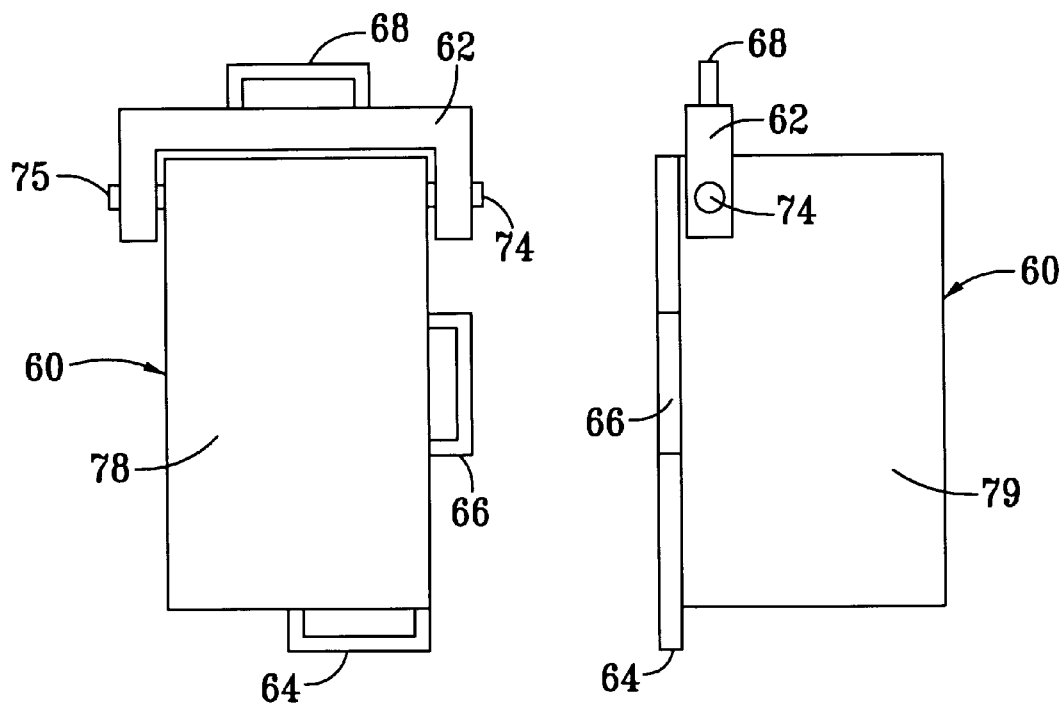
FIGS. 3a and 3b are respective top and side views of a quick release unit according to the present invention.
Figure 4:
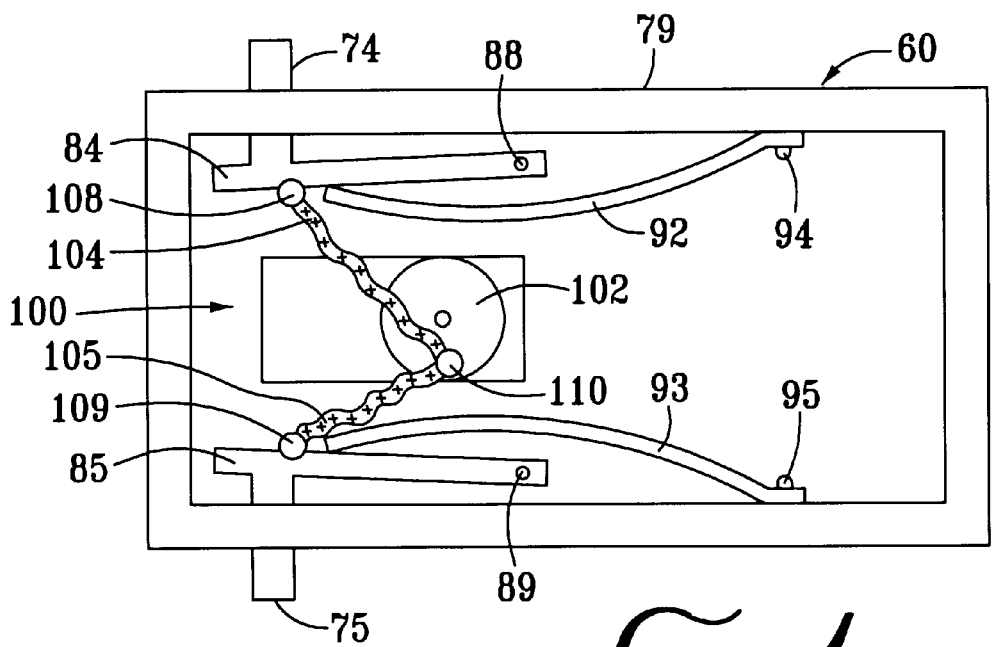
FIG. 4 is a view of the quick release unit of FIG. 3 with a cover removed showing the internal servo mechanism thereof.

Turning now to FIGS. 3a, 3b and 4, the quick release unit 60 is shown in detail. The same includes a body 79 and cover plate 78, wherein the loops 64 and 66 are part of the cover plate 78. FIG. 4 shows the quick release unit 60 with the cover plate 78 removed. The pins 74 and 75 are formed on or attached to respective arms 84 and 85 which are pivotally attached at 88 and 89 inside the body 79 of the unit 60. Suitable leaf springs 92 and 93 are affixed at 94 and 95 to the body 79, and the free ends of these springs 92, 93 bear upon and bias the respective arms 84 and 85 outwardly, thereby biasing or moving the respective pins 74 and 75 outwardly to lock with mating openings in the hook 62. A remotely controllable servo motor 100 is secured within the body 79 of the unit 60 in a fixed position, and includes a rotatable disk 102 driven in a rotary motion by an internal servo motor (not shown) in a conventional manner. Wire cables 104 and 105 are secured at their outer ends at 108 and 109 to respective arms 84 and 85, and at their inner ends to a pin or other fastener 110 on the disk 102. When the servo 100 is actuated, the disk 102 is rotated (counterclockwise in the embodiment as seen in FIG. 4) to pull the cables 104 and 105 and thus pull the arms 84 and 85 inwardly against the resistance of the springs 92 and 93 to retract the respective pins 74 and 75 from the hook 62. In this manner the hook 62 is unhooked from the unit 60 to allow the muzzle assembly to fall from the dog as described earlier. It will be appreciated that alternative arrangements could be used for releasing the hook 62 such as solenoid actuated pins, latches and the like.

Turning now to FIGS. 5a and 5b, FIG. 5a illustrates a transmitter and FIG. 5b illustrates a receiver. The receiver can be a separate unit physically mounted on the muzzle shield 21 or on the unit 60, or in any other suitable manner on the dog, so as to receive control signals and actuate the stun gun 43 and the quick release unit 60. The transmitter, which is usually a hand-held transmitter, includes first and second switches SW1 and SW2, and a code generator responsive to actuation of each switch to generate a respective code which, in turn, is amplified by a data and signal amp, and further amplified and transmitted to the receiver. One switch is used to turn on and off the stun gun, and the other switch is used to operate the quick release unit 60 to release the hook 62. The receiver includes a first amplifier, followed by a data collection amplifier, which in turn is followed by a mother board with a decoder and four bit control output. This actuates a relay in the stun gun which in turn energizes or de-energizes the stun muzzle. Similarly, a switch is actuated to operate the servo of the quick release unit 60 when desired. Preferably the transmitter and receiver system operates in an available band with minimal interference such as in the 300 MHz frequency range. Operating in the 300 MHz and using coded signals for the two functions, stun gun activation and quick release activation, provides reliable activation without interference.

While embodiments of the present invention have been shown and described, various modifications may be made without departing from the scope of the present invention, and all such modifications and equivalents are intended to be covered.

What is claimed is:

1. An apparatus for use with trained dogs including a device attachable to a dog such as a muzzle, collar harness or other similar attachable device, comprising
    a quick release unit for attaching the device to the body of the dog,
    a stimulus module for producing stimuli perceptible by humans in the presence of the dog, said stimulus module being remotely actuable, the stimulus module being attached to the device, and
    a remote control unit for remotely and selectively actuating the stimulus module and the quick release unit, whereby actuation of the quick release unit allows the device to drop off the dog.

2. An apparatus as in claim 1 wherein the stimulus module is a device capable of emitting high voltage electrical sparks.

3. An apparatus as in claim 1 wherein the device is attachable to the dog by straps, at least one of the straps being attached to the quick release unit but being detachable therefrom under control of the remote control unit.

4. An apparatus for use with trained dogs including a device attachable to a dog such as a muzzle, collar, harness or other similar attachable device, comprising
    straps for attaching the device to the body of a dog,
    a stimulus module for producing stimuli perceptible by humans in the presence of the dog, said stimulus module being remotely actuable, the stimulus module being attached to the device,
    a quick release unit for attaching at least one of the straps to the device and being remotely actuable to allow the device to drop off the dog, and
    a remote control unit for remotely and selectively actuating the stimulus module and the quick release unit.

5. An apparatus as in claim 4 wherein the stimulus module is a device capable of emitting high voltage electrical sparks.

6. An apparatus for use with trained dogs including a device attachable to a dog such as a muzzle, collar, harness or other similar attachable device, comprising
    the device including a plurality of straps for attaching the device to the body of the dog,
    at least one of the straps including a quick-release unit that allows the device to drop off the dog when the quick release unit is actuated,
    a stimulus module for producing stimuli perceptible by humans in the presence of the dog, said stimulus module being remotely actuable and the stimulus module being attached to the device, and
    a remote control system for allowing the stimulus module and the quick release unit to be remotely and selectively actuated to respectively cause the stimulus module to produce a stimulus and the quick release unit to be actuated.

7. An apparatus as in claim 6 wherein the stimulus module is a device capable of emitting high voltage electrical sparks.

8. An apparatus for use with trained dogs including a muzzle attachable to a dog comprising:
    a quick release unit for attaching the muzzle to the body of the dog; and
    a remote control unit for remotely and selectively actuating the quick release unit, whereby actuation of the quick release unit allows the muzzle to drop of the dog.

9. An apparatus as in claim 8, further comprising a stimulus module for producing stimuli perceptible by humans in the presence of the dog, said stimulus module being remotely actuable, the stimulus module being attached to the muzzle.

10. An apparatus as in claim 9, wherein the stimulus module is remotely and selectively actuated by the remote control unit.

* * * * *